Figure 1:
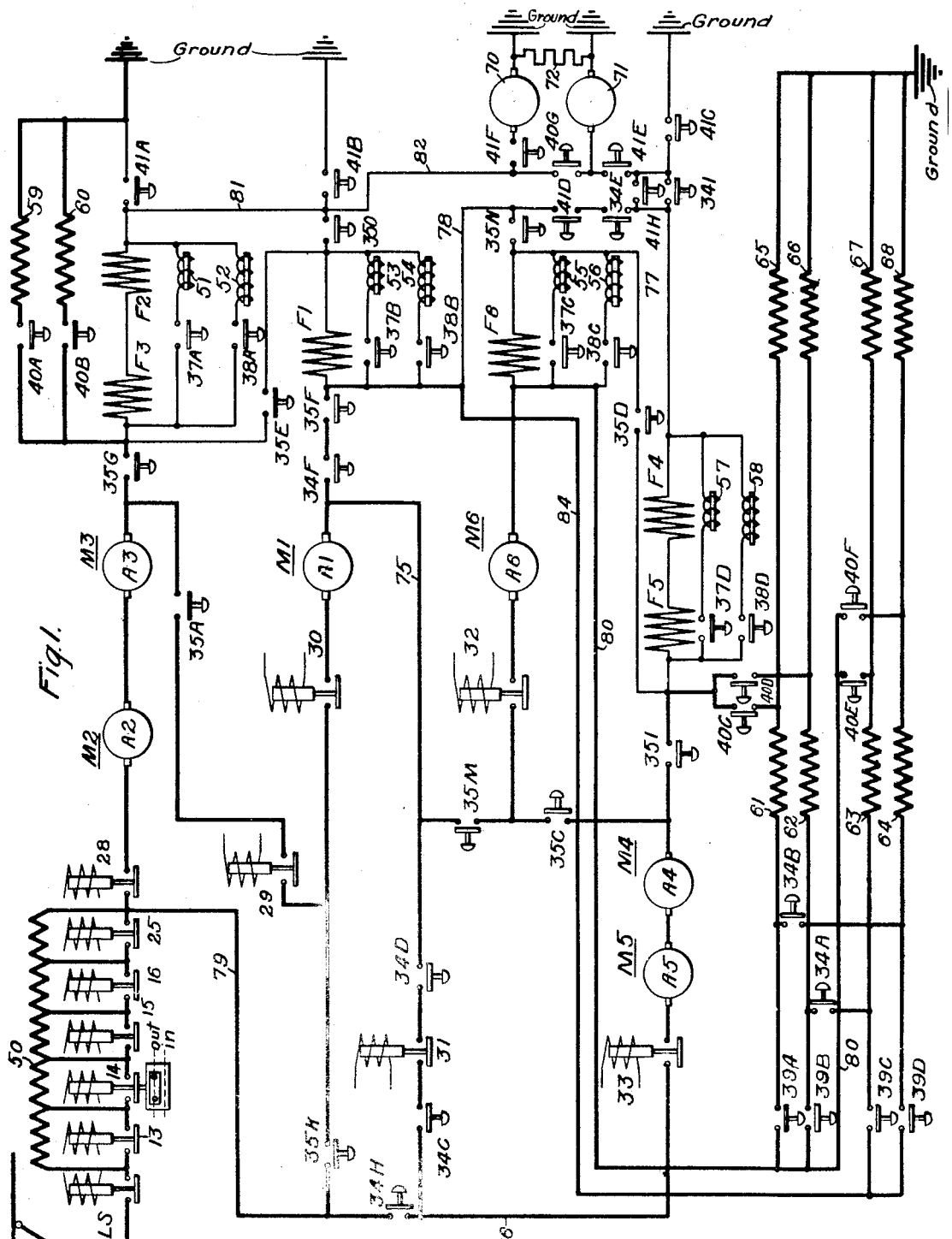

Aug. 12, 1924.

A. J. HALL ET AL

SYSTEM OF CONTROL

Filed July 30, 1920

WITNESSES:
J. A. Helsel
W. R. Coley

INVENTORS
Arthur J. Hall
Paul L. Mardis &
Alexander McIver
BY
Wesley G. Carr
ATTORNEY

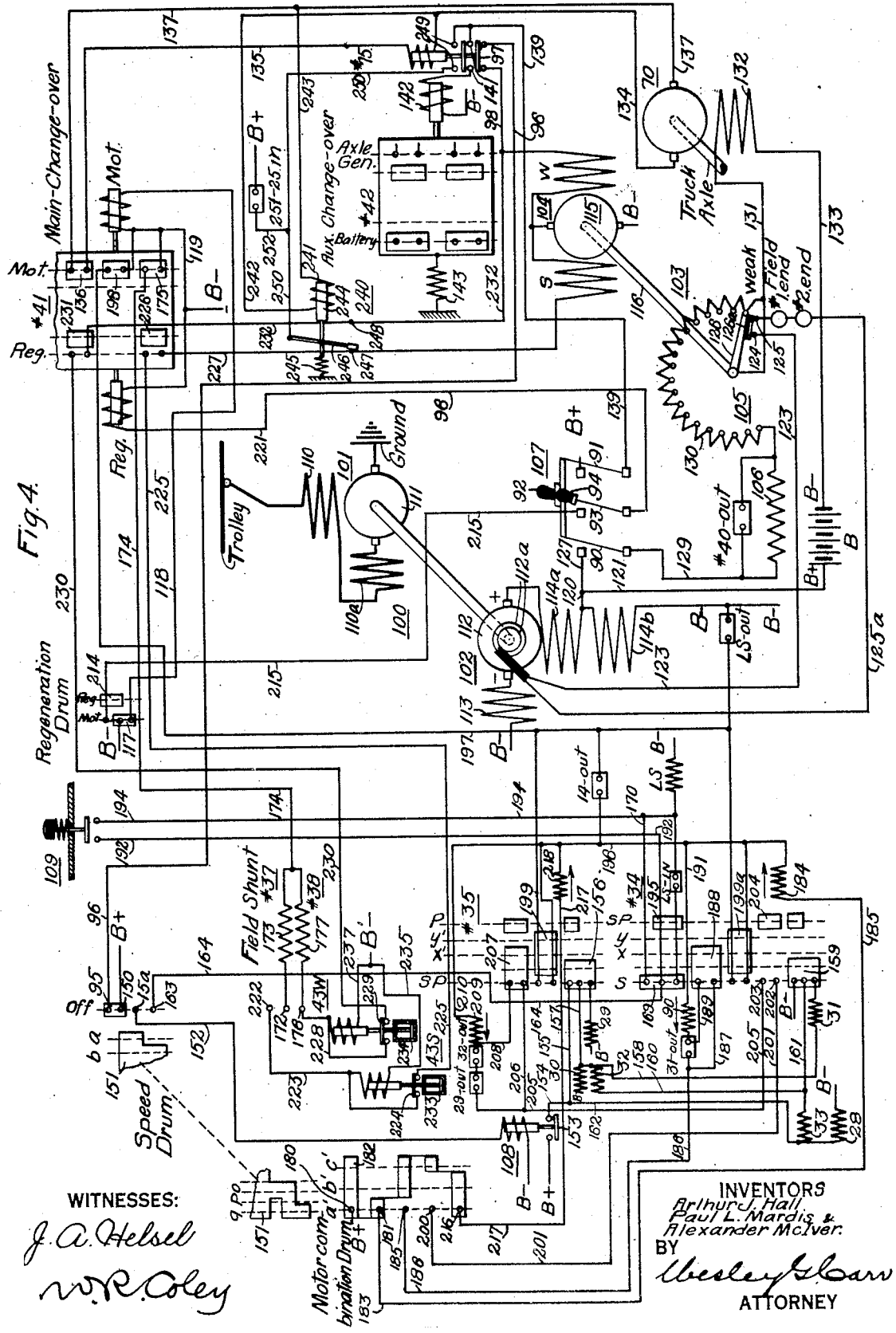

Patented Aug. 12, 1924.

1,504,553

UNITED STATES PATENT OFFICE.

ARTHUR J. HALL, OF WINCHCOMBE, ENGLAND; PAUL L. MARDIS, OF SWISSVALE, PENNSYLVANIA; AND ALEXANDER McIVER, OF DEER LODGE, MONTANA, ASSIGNORS TO WESTINGHOUSE ELECTRIC & MANUFACTURING COMPANY, A CORPORATION OF PENNSYLVANIA.

SYSTEM OF CONTROL.

Application filed July 30, 1920. Serial No. 400,159.

*To all whom it may concern:*

Be it known that we, ARTHUR J. HALL, a subject of the King of Great Britain, and a resident of Winchcombe, England; PAUL L. MARDIS, a citizen of the United States, and a resident of Swissvale, in the county of Allegheny and State of Pennsylvania; and ALEXANDER McIVER, a citizen of the United States, and a resident of Deer Lodge, in the county of Powell and State of Montana, have invented a new and useful Improvement in Systems of Control, of which the following is a specification.

Our invention relates to systems of control for dynamo-electric machines and it has special relation to the control and operation of electric railway motors during both the accelerating and the regenerative periods.

The object of our invention, generally stated, is to provide certain improved interocking features in connection with the auxiliary circuits for effecting remote control of a plurality of railway motors, whereby reliable and satisfactory operation may be effected.

Various specific objects of our invention will become evident from the following detailed description, taken in conjunction with the accompanying drawings, wherein Fig. 1 is a diagrammatic view of the main circuits of a system of locomotive control to which our invention may be applied;

Fig. 2 and Fig. 3 are sequence charts, of well-known form, for indicating the preferred order of operation of the various switching devices that are illustrated in the other figures; and Fig. 4 is a diagrammatic view of certain auxiliary or control circuits that are organized and arranged in accordance with the various principles of the present invention.

Although the novel features of our invention are embodied in the auxiliary governing circuits, it is deemed necessary to explain, as briefly as possible, the operation of the main motors and trace the various circuits thereof under different operating conditions, in order that the actual results accomplished by our auxiliary governing circuits and the reasons for arranging such circuits in the manner illustrated may be evident. Consequently, the main-circuit connections and changes will first be described in conjunction with the two sequence charts, and the various illustrated auxiliary-circuit connections and changes will be set forth later.

For a more detailed explanation of the main-circuit connections, reference may be had to a copending application of Normal W. Storer, Serial No. 493,459, filed August 18, 1921, and assigned to the Westinghouse Electric & Manufacturing Company.

Referring to Fig. 1 of the drawings, the system here shown comprises supply-circuit conductors Trolley and Ground; a plurality of main dynamo-electric machines M1 to M6, inclusive, which are respectively provided with commutator-type armatures A1 to A6 and field windings F1 to F6, inclusive, the machines being adapted for both acceleration and regeneration; a plurality of electrically-controlled switches, designated in Fig. 2 as line switch LS, resistor switches 13, 14, 15, 16 and 25 and motor switches 28 to 33, inclusive; a plurality of cam-operated switches which are illustrated in Fig. 1 without an actuating coil to distinguish them from the electrically-actuated switches, the various cam-operated switches being designated in Fig. 2 as #34 group, including switches 34A to 34F, inclusive, 34H an 34I, and #35 group, embodying switches 35A, 35C, 35E, 35F, 35G, 35I, 35K, 35M, 35N and 35—O.

Four other groups of cam-operated switches, designated in Fig. 2 as #37, #38, #39 and #40, are also provided, the #37 group being employed for closing certain shunt connections around the various main field windings during acceleration to increase the motor speed, in accordance with familiar principles, the #38 group being employed for a similar purpose to produce a still higher speed, and the #39 and #40 groups being utilized, during regeneration only, for connecting various stabilizing resistors 59 to 68, inclusive, in circuit with the main armatures, as subsequently traced in detail.

In addition, a plurality of sets of cam-operated switches, designated in Fig. 3 as #41 and #42 groups, are employed for the purpose of effecting a changeover of certain main-circuit connections from motoring to regeneration and for effecting certain corresponding changeover operations in the auxiliary circuits, as hereinafter more fully set forth.

The main system shown in Fig. 1 further comprises an accelerating resistor 50, which is adapted to be short-circuited in section by the switches 13, 14, 15, 16 and 25; an inductive shunt 51, which may be connected across the field windings F3 and F2 by means of the cam-operated switch 37A; a second inductive shunt 52 of higher value, which may be connected across these field windings through the agency of cam-operated switch 38A, for purposes previously set forth; and a plurality of corresponding inductive shunts 53 to 58, inclusive, which are associated with the other field windings and the various remaining switches of the #37 and the #38 cam groups.

For the purpose of supplying energy to the main field windings during the regenerative period, a plurality of axle-driven generators or exciters 70 and 71 are provided, the grounded terminals thereof being connected through an equalizing resistor 72.

Referring to the sequence charts, it will be noted that, in the "off" position of the speed drum and in the normal position a' of the motor combination drum, the only switches closed are the #34 cam group switches 34A to 34E, inclusive, and the #35 cam group switches 35A, 35C, 35E and 35F. Consequently, no complete circuits are closed, since the cam group switches enumerated merely prepare portions of certain circuits for the subsequent closure of certain resistor or motor switches.

The speed drum is employed for controlling the various resistor switches to govern the motor speed, while the motor combination drum is employed to govern the grouping of the six motors in either series relation or in one of the two possible series-parallel relations, namely, two parallel-connected sets of three motors in each set in series relation and three parallel-connected sets of two motors in each set in series relation.

The main-circuit connections established by the initial closure of the line switch and the remaining motor switches may be traced in Fig. 1 as follows: from the trolley through line switch LS, the entire accelerating resistor 50, motor switch 28, armatures A2 and A3, cam switch 35A, motor switches 29 and 30, armature A1, conductor 75, cam switch 34D, motor switch 31, cam switch 34C, conductor 76, motor switch 33, armatures A5 and A4, cam switch 35C, motor switch 32, armature A6, field winding F6, conductor 77, cam switch 35D, field windings F5 and F4, cam switches 34E and 41D, conductor 78, field winding F1, cam switch 35E, field windings F3 and F2 and cam switch 41A to ground.

By actuating the speed drum through successive positions a, b, etc., the resistor-short-circuiting switches 13 to 16, inclusive, and 25 are successively closed, as indicated in the sequence chart, Fig. 2, until the full series position is reached.

By actuating the speed drum to positions o and q, respectively, the "intermediate field" and the "short field" excitation conditions of the motors are produced by reason of shunting the field windings by the various inductive devices 51 to 58, inclusive, as previously set forth and as indicated in Fig. 2 by the closure of the #37 and #38 cam group switches.

To effect transition of the motors to the next speed combination, the motor combination drum is actuated to its second position b' and the speed drum is then returned to its first position or notch to open all of the resistor-short-circuiting switches, as set forth by the corresponding legend in Fig. 2.

The desired transition then takes place as follows. The switches 34A and 34B are opened, which, however, has no effect upon the circuits, in the "motoring" connections. Switch 34F is closed and since the cam switch 35F was originally closed, a direct connection is made between armature A1 and field winding F1, or, in other words, the motors M5, M4 and M6 are temporarily short-circuited during the transitional period.

In the next place, electrically-actuated switches 31, 32 and 33 are opened to rupture the short-circuit reverse current in the shunted motors and to disconnect the short-circuited motors from the other motors temporarily. Cam switches 34C, 34D and 34E are then opened and switches 34H and 34I are then closed to prepare the motor circuits for proper re-connection to the line as soon as motor switches 32 and 33 are again closed.

The motors are thus connected in initial series-parallel relation, two parallel-related sets of three series-connected motors each being connected across the supply circuit. At this time, the motor circuits may be traced in Fig. 1, as follows. One circuit is established from the resistor 50 through motor switch 28, armatures A2 and A3, cam switch 35A, motor switches 29 and 30, armature A1, cam switches 34F and 35F, field winding F1, cam switch 35E, field windings F3 and F2 and cam switch 41A to ground.

A second circuit is continued from the resistor 50 through conductor 79, cam switch 34H, conductor 76, motor switch 33, armatures A5 and A4, cam switch 35C, motor switch 32, armature A6, field winding F6, conductor 77, cam switch 35D, field windings F5 and F4 and cam switches 34I and 41C to ground.

By again actuating the speed drum through its various positions in a forward direction, the resistor-short-circuiting switches are successively closed and thereafter the cam group switches #37 and #38 are closed in succession to provide the "intermediate field" and the "short field" speeds of the motors.

To effect transition to the final speed combination of the motors, the motor combination drum is actuated to its position $c'$ and the speed drum is returned to an intermediate position, such as its second position or notch, to open a portion of the resistor switches, as indicated by the corresponding legend in Fig. 2.

In the first place, the cam switches 35G and 35I are closed to directly connect armature A3 and field winding F3 and also armature A4 and field winding F5. In other words, the motors M1 and M6 are temporarily short-circuited during the transition.

The motor switches 29, 30 and 32 are next opened and then the cam switches 35A, 35C, 35D, 35E and 35F are opened prior to the closure of cam switches 35K, 35M, 35N and 35—O. The switch 35M serves to connect the armatures A1 and A6 in series relation, while the switches 35K, 35N and 35—O serve to complete the circuit of these motors from the resistor 50 to ground, with the exception of the gaps caused by the switches 30 and 32.

Consequently, as soon as the motor switches 30 and 32 are closed, the desired speed combination of the motors is completed, as may be traced in Fig. 1, as follows. One circuit is established from the resistor 50 through motor switch 28, armatures A2 and A3, cam switch 35G, field windings F3 and F2 and cam switch 41A to ground. Another circuit is established from the resistor 50 through conductor 79, cam switch 35K, motor switch 30, armature A1, conductor 75, cam switch 35M, motor switch 32, armature A6, field winding F6, cam switch 35N, conductor 78, field winding F1 and cam switches 35—O and 41B to ground. A third branch circuit is completed from the resistor 50 through conductor 79, cam switch 34H, conductor 76, motor switch 33, armatures A5 and A4, cam switch 35I, field windings F5 and F4 and cam switches 34I and 41C to ground.

By again moving the speed drum in a forward position, the remaining resistor-short-circuiting switches are closed and the motors are accelerated to the full speed value corresponding to the series-parallel combination just described for full field excitation. By actuating the speed drum to positions $o$ and $q$, respectively, the "intermediate field" and "short field" excitations of the motors may be secured to provide still higher operating speeds, as previously set forth.

During regenerative operation, the cam groups #37 and #38 are not employed, that is, all of the corresponding switches remain in the open position, as indicated in the sequence chart, Fig. 2, while the cam groups #39 and #40 are utilized, the former during the two lower-speed motor combinations and the latter during the highest-speed combination.

Assuming that the motors are operating at a suitable speed to permit regeneration with the motors connected in the highest-speed combination, since the "intermediate field" and the "short field" connections are not utilized, it will be noted that switches LS, 28, 30, 32, 33, 34F, 34H, 34I, 35G, 35I, 35K, 35M, 35N, 35—O, 41E, 41F, 41H, and the entire group of #40 cam switches are closed.

Under these conditions, the main armature or regenerative circuit is established from the trolley through line switch LS, resistor 50, where the circuit divides, one branch including motor switch 28, armatures A2 and A3, cam switch 35G, whence circuit is continued through two branches respectively including cam switch 40A and stabilizing resistor 59, and cam switch 40B and stabilizing resistor 60 to ground.

Another circuit is established from the resistor 50 through conductor 79, cam switch 35K, motor switch 30, armature A1, conductor 75, cam switch 35M, motor switch 32, armature A6, conductor 80, where the circuit divides, one branch including cam switch 40E and stabilizing resistor 67, and the second branch including cam switch 40F and the stabilizing resistor 68, circuit being completed to the negative conductor Ground.

A third circuit is established from resistor 50 through conductor 79, cam switch 34H, conductor 76, motor switch 33, armatures A5 and A4, cam switch 35I, where the circuit divides, one branch including cam switch 40C and stabilizing resistor 65, and the other branch including cam switch 40D and the stablizing resistor 66, a common circuit being continued to ground.

One main field winding or exciting circuit is established from the positive terminals of the axle-driven generators 70 and 71 through the ground, parallel-connected stabilizing resistors 59 and 60 with their corresponding switches 40A and 40B, field windings F3 and F2, conductors 81 and 82 and cam switches 41F and 40G to the remaining terminals of the axle-driven generators 70 and 71.

Another exciting circuit is established from the ground through parallel-connected stabilizing resistors 65 and 66 and the corresponding cam switches 40C and 40D, field windings F5 and F4 and cam switches 34I and 41E and also 40G and 41F to the negative terminals of the axle-generators.

A third circuit is continued from ground through parallel-connected resistors 67 and 68 and associated cam switches 40E and 40F, conductor 80, field winding F6, cam switch 35N, conductor 78, field winding F1, cam switch 35—O, conductor 82 and cam switches 41F and 40G to the negative terminals of the axle-driven generators.

As the speed of the momentum-driven main machines decreases, the excitation of the axle-driven generators 70 and 71 is manually increased until limiting conditions are reached, when it is necessary to effect transition of the motors to the next lower speed combination. This transition is effected by returning the speed drum to the "off" position to open all main circuits, moving the motor combination drum to position $b'$, and again actuating the speed drum through its operative positions.

It will be noted that, in the next lower speed combination, the cam group #39 is active while the cam group #40 is not employed. At this time, therefore, the armatures A2, A3 and A1 are connected in series relation and another circuit contains the series-connected armatures A5, A4 and A6. From the right-hand terminal of armature A1, a circuit is established through cam switches 34F and 35F, conductor 84, where the circuit divides, one branch including cam switch 39C, resistors 63 and 67, and another branch including cam switch 39D and resistors 64 and 68, whence circuit is continued to ground.

A corresponding circuit is continued from the right-hand terminal of the armature A6 through conductor 80, where the circuit divides, one branch including cam switch 39A and stabilizing resistors 61 and 65, while the other branch includes cam switch 39B and stabilizing resistors 62 and 66, a common circuit being completed to ground.

Consequently, a higher value of stabilizing resistance is included in circuit with the momentum-driven motors during the lower speed combination, since this arrangement is found to be conducive to satisfactory op-erating conditions. The exciting field-winding circuits include the various sets of stabilizing resistors corresponding to the conductors 80 and 84, one such circuit being continued from the conductor 80 through field winding F6, conductor 77, field windings F5 and F4 and cam switch 34I and 41E to the axle-generator 71.

A corresponding circuit is completed from the conductor 84 through field winding F1, cam switch 35E, field windings F3 and F4, conductors 81 and 82 and cam switch 41F to the axle-generator 70.

The excitation of the axle-generators is again manually increased to the limiting condition as the main-machine speed decreases, and the transition of the motors to series relation is then effected by the open-circuit method previously described, the motor combination drum being actuated to position $a'$.

Consequently, at this time, the six main armatures are connected in series relation and a circuit is continued from the right-hand terminal of the armature A6 through conductor 80 and the various switches of the #39 cam group to the corresponding stabilizing resistors, as previously traced, with the following change in circuits, namely, the closure of cam switches 34A and 34B, whereby the four stabilizing resistor circuits are connected in parallel relation to reduce the total value of the stabilizing resistor circuit, which is a desirable operation condition when the motor speed has been reduced to that corresponding to series connection of the machines.

The exciting circuit at this time includes the stabilizing resistor circuits as just described, conductor 80, whence circuit is continued through field windings F6, F5 and F4 to the axle-generator 71, as previously traced, while a branch circuit is continued from conductor 84 through field windings F1, F3 and F2 to the axle-generator 70, as already set forth.

Regeneration may be continued with the series connection of the motor armatures, as the speed of the momentum-driven machines decreases, by gradually increasing the excitation of the axle-generators until the limiting condition is reached, as will be understood.

Referring to Fig. 4, the auxiliary system here shown comprises the supply-circuit conductors Trolley and Ground, from which the motor-generator set 100 comprising a driving motor 101 and an exciter or generator 102 is fed; together with a power-operated rheostatic device 103 comprising a pilot motor 104 and a face-plate rheostat 105; an auxiliary resistor 106; an interlocking knife-blade device 107; a motor switch relay 108, a push-button or auxiliary device 109; a main-circuit changeover drum 41, one function thereof being to effect certain rearrangements of circuits when it is desired to change from motoring to regeneration or vice versa; an auxiliary changeover drum for transferring the energization of certain auxiliary circuits from a battery B, under normal conditions, to the axle-generator 70 by means of a relay device #75 under predetermined conditions; the actuating coils of the cam groups #34 and #35 and the actuating coils of various other switching devices that are illustrated in Fig. 1; and a plurality of primary or master controlling devices, respectively designated as speed drum, motor combination drum and regeneration drum, for performing functions which will be evident from these names.

The driving motor 101 of the motor-generator set 100 is shown as comprising a series exciting field winding 110, a commutating field winding 110a and a commutator-type armature 111, which are all connected in series relation across the supply-circuit conductors Trolley and Ground. This circuit constitutes the only high-voltage circuit in the auxiliary governing system, since the energization of all other circuits is accomplished from the low-voltage generator 102 and the battery B of comparable voltage.

The generator 102 is shown as comprising a commutator-type armature 112, which is also provided with slip-rings 112a, a commutating field winding 113 and a plurality of exciting field windings 114a and 114b. It will be understood that any suitable arrangement of field windings for both the motor 101 and the generator 102 may be employed. The generator is connected in parallel with the storage battery B to charge the latter and also to permit energization of the various auxiliary circuits from the battery whenever the generator 102 is disconnected for any reason.

The pilot motor 104 comprises a commutator-type armature 115, which is connected as by a shaft 116 to the movable member of the face-plate rheostat 105. A plurality of oppositely-acting and alternatively-employed field windings S and W, standing for strengthen and weaken, respectively, are provided for the pilot motor. The energization of the one or the other field winding in a manner to be set forth later serves to effect movement of the face-plate rheostat 105 in the one or the other direction, whereby the excitation of the axle-generator 70, which is employed for exciting the main field windings during regeneration, as previously described, may be strengthened or weakened.

The interlocking switching device 197, in so far as the stationary members are concerned, is constructed similarly to a three-pole single-throw switch. However, instead of a single three-blade movable member, two movable switch members are provided for purposes to be set forth. One of these switch members comprises a pair of blades 90 and 91 for engaging the outer pairs of stationary terminals, these blades being provided with a single operating handle 92. The middle set of stationary jaws are adapted to be connected by means of a blade 93 which is provided with a separate handle 94 that rests upon the handle member 92 when all three blades are closed. Consequently, the switch blade 93 may be opened without disturbing the other switch blades, but the actuation of the handle 92 will cause the simultaneous opening of all three switch blades. The structure of the switching device 107 is not of our present invention but is fully set forth and claimed in a copending application of P. L. Mardis, Ser. No. 421,884, filed Nov. 5, 1920, and assigned to the Westinghouse Electric & Manufacturing Company.

For the sake of simplicity and clearness, all the circuits for controlling the switches illustrated in Fig. 1 that are not directly concerned in carrying out one or more of the novel features of our present invention have been omitted from Fig. 4. It is believed that the following exposition of the auxiliary circuits will be clear and fully intelligible without a detailed illustration or tracing of circuits for closing the resistor-short-circuiting switches, etc. Furthermore, the control effected by the switches illustrated in Fig. 4 will be fully understood by reference to the main circuits of Fig. 1, and, consequently, the reasons for the various interlocking circuits in Fig. 4 will thus be made evident.

The operation of the illustrated auxiliary circuits in Fig. 4, during the accelerating period of the main motors, may be set forth as follows. From the positively-energized conductor B+ of the battery B, a circuit is initially established through contact segment 117 of the regeneration drum in its motoring position "Mot.," whence circuit is continued through conductor 118, actuating coil Mot. of the main-circuit changeover drum #41 and conductor 119 to the negative battery conductor B—. Consequently, the main-circuit changeover drum #41 is either actuated to, or is retained in, the position corresponding to motoring operation whenever the auxiliary-circuit regeneration drum is thrown to its position "Mot."

Assuming that the motor-generator set 100 is operating and that the field windings of the generator 102 are, therefore, energized, another auxiliary direct-current circuit is established from the positive terminal of the generator 102 through commutating field winding 114a to junction-point 120, to which the positive battery wire B+ is connected, by conductor 121. Furthermore, under the illustrated conditions, an alternating-current circuit is established from one of the slip-rings 112a of the generator 102 through conductor 123, stationary contact members 124 and 125, which are bridged by an insulated contact member 126a on the swinging arm 126 of the face-plate rheostat 105 in the normal, extreme right-hand position, corresponding to the weakest field condition of the axle-driven generator 70, whence circuit is completed under such conditions through signalling means, such as pilot lamps, designated as #1 end and #2 end, and conductor 125A to the other slip ring on generator. Consequently, the train operator, when standing on either platform of the locomotive, is apprised of the fact that the excitation of the axle-driven generator has reached its weakest condition, and, at the same time is assured that the motor-generator set is running, since the battery B does not energize the pilot lamps. It is desirable that these conditions obtain before regenerative operation at any speed or with any motor combination is attempted.

Thus, whenever the previously-described open-circuit transitions are made during the regenerative period from one speed combination to another, a minimum amount of time is lost, and it is ensured that conditions are again suitable before regenerative operation at the lower speed combination is begun.

Furthermore, it is ensured that the face-plate rheostat 105 always returns to its illustrated weak-field position whenever the speed drum is returned to its illustrated "off" position for any reason. This action is effected through a circuit that is established from the positive battery conductor B+ through contact segment 95 in the "off" position of the speed drum, conductor 96, contact disk 97 of the axle-generator relay #75 in its lower or normal position, conductor 98, field coil W and armature 115 of the pilot motor 104 to the negative battery conductor B—. In this way, the face-plate rheostat 105 is immediately returned to its weak field position from any previously-occupied position, whenever the speed drum is actuated to its "off" position.

Another circuit is established from the positively-energized junction-point 120 through conductor 127, switch blade 90 of the interlocking switching device 107, conductor 129, resistor 106 or electrical interlock #40—out, dependent upon whether the cam switches 40 occupy their closed or their open position, whence circuit is continued through the active portion of a resistor 130 of the rheostat 105 to the swinging arm 126, conductor 131, exciting field coil 132 for the axle-driven generator 70 and conductor 133 to the negative conductor B—. In this way, the excitation of the axle-driven generator 70 is varied in accordance with the movements of the face-plate rheostat 105 and also is dependent upon the position of the cam switches of the #40 group.

From the sequence chart, Fig. 2, it will be noted that the switches of the #40 cam group are closed only during the highest-speed regenerative combination or grouping, in which case it is not necessary to provide a very high excitation to the axle-generator field winding 132, since the generator armature is likewise traveling at this high rate of speed.

Under these conditions, therefore, the electrical interlock or auxiliary contact segment #40—out is not employed or, in other words, the resistor 106 is actively connected in circuit with the face-plate rheostat resistor 130 to correspondingly reduce the voltage of the axle-generator field winding 132 throughout the operation of the main machines when connected in the high speed combination or grouping. On the other hand, for the two lower speeds of the main motors, a higher excitation of the axle-generator field winding is necessary to compensate for the lower speed of the generator. Therefore, the interlock or auxiliary segment #40—out is connected, as illustrated in Fig. 4, to short-circuit the resistor 106 and thus allow a higher voltage to be impressed upon the axle-generator field winding 132, in this way permitting the full regulation of this voltage to be accomplished by the face-plate rheostat 105.

Normally, the auxiliary change-over drum #42 occupies the illustrated position wherein the battery B is adapted to furnish energy to certain of the auxiliary devices on the locomotive, such as the compressor and blower motors, and the drum is biased to the illustrated position by means of a suitable spring 143, for example.

However, when the locomotive speed has increased to a certain value that is suitable for employing the axle generator 70, by reason of its having developed full voltage, to supply the desired energy to these auxiliary devices and thereby save draining the battery, the axle-generator relay device #75 is energized to effect this function by means of a circuit that is established from one armature terminal of the axle-generator 70 through conductor 134, actuating coil of the relay #75, conductor 135, contact segment 136 of the main changeover drum #41 in its motoring position, thus ensuring that the present change will be made during motoring conditions only, circuit being continued through conductor 137 to the opposite armature terminal of the axle-generator.

As soon as the relay device #75 has been energized sufficiently to lift it to its upper position, a new circuit is established from the positive conductor B+ through switch blade 91 of the interlocking switch device 107, conductor 139, contact disk 97 and stationery contact terminals 141 of the relay member 75 and thence through actuating coil 142 of the auxiliary changeover drum #42 to the negative conductor B—. Consequently, the auxiliary changeover drum is actuated to its position marked "Axle Gen.," whereby the desired energy is supplied to the compressor and blower motors, or the like, from the axle-generator 70 as long as the voltage thereof remains above a predetermined value corresponding to a relatively low locomotive speed.

As soon as the speed drum is actuated to its initial operative position a, a new circuit is established from the positive conductor B+ through control fingers 150 and 150a, which are bridged by contact segment 151, whence circuit is continued through conductor 152 and the actuating coil of the motor switch relay 108 to the negative conductor B—. The lifting of this relay serves to effect the closure of the energizing circuits for the several motor switches 28 to 33, inclusive, as about to be set forth. In this way, a single wire from the master controller effects the closure of six switches, while the cam groups #34 and #35 further control the operation of these switches, as hereinafter set forth.

The cam groups #34 and #35 are similar in construction, embodying a set of switches that are operated from a cam shaft in accordance with a well-known practice. The forward or backward movement of this shaft is controlled in the case of the cam group #34, for example, by means of actuating coils 184 and 190 which are respectively adapted to turn the cam shaft in the directions corresponding to the accompanying arrows. Since the particular structure of the switching devices is not material to our present invention, we have not deemed it necessary to illustrate the cam groups beyond the diagrammatic showing in Fig. 4.

The cam group #34 is normally adapted to occupy a position S, and, when energized by the actuating coil 184, the cam group will move through transition positions $x$ and $y$ to a final position SP, which corresponds to the first series-parallel or the intermediate speed combination of the main motors. The cam group #34 remains in this position during the changeover of the motors to the highest speed combination, which is accomplished by means of the other cam group #35, which normally occupies its position SP corresponding to both series and the first series-parallel stages of operation. When an actuating coil 218 is energized, the cam group #35 is moved through its transition positions $x'$ and $y'$ to a final position P corresponding to the second series-parallel or the highest speed combination of the motors.

With the relay 108 closed, therefore, a new circuit is established from the positive conductor B+ through contact disk 153 of the relay device, conductors 154 and 155, contact segment 156 of the cam group #35 in its normal position SP, where the circuit divides, one branch including conductor 157, and the actuating coil of motor switch 30, and the other branch including the actuating coil of motor switch 29.

Another circuit is continued from the conductor 157 through conductor 158, the actuating coil of switch 31 to contact segment 159 of the cam group #34 in its normal position S, and thence to the negative conductor B—.

Still another circuit is continued from the conductor 157 through the actuating coil of switch 32 and conductors 160 and 161 to contact segment 159. A final circuit is continued from the conductor 154 through conductor 162 and thence through the actuating coils of the switches 33 and 28 to the negative conductors 161 and B—, respectively.

In this way, the previously-traced main motor series circuit is closed with the exception of the gap caused by the line switch LS. This circuit is completed as soon as the speed drum is actuated to its position $b$, by reason of the engagement of the contact segment 151 with control finger 163, whence circuit is continued through conductor 164, contact segment 169 of the cam group #34 in its normal position S, conductor 170 and actuating coil of the line switch LS to the negative conductor B—. In this way, the line switch LS is also closed.

The speed drum is then moved through a certain number of positions for gradually effecting the closure of a predetermined number of resistor-short-circuiting switches, a few of which are shown as 13, 14, 15, 16 and 25, and, in this way, the full series relation of the motors is attained in position $o$ of the speed drum.

When the next succeeding position $p$ of the speed drum is reached, a new circuit is established from the contact segment 151 through control finger 172, actuating coil 173 of the cam group #37, conductor 174, contact segment 175 of the main changeover drum #41, in its position "Mot." only, and thence through conductor 119 to the negative battery conductor B—. Consequently, the #37 cam group switches are closed to effect the shunting of the inductive devices 51, etc., across the corresponding field windings to produce a higher main-motor speed, as previously described. In the final position $q$ of the speed drum, a new circuit is established from the contact segment 151 through conductor 176, actuating coil 177 of the cam group #38, whence circuit is continued through conductor 174 to the negative conductor B—, as already traced. In this way, the second "extra speed" of the motors is brought about.

The initial circuit that is established by the motor combination drum in its normal position $a'$ is from the positive battery conductor B+ through control fingers 180 and 181, which are bridged by contact segment 182, whence circuit is continued through conductor 183, actuating coil 184 of the cam group #34, conductor 196, interlock 14— out (of the familiar type shown in Fig. 1), conductor 197, and contact segment 198 of the main changeover drum #41 in its position Mot. to negative conductor 119. During regeneration, the interlock LS—out is substituted for the contact segment 198. In this way, it is ensured that the cam group #34 may not be moved in the "motoring" connections until proper resistance for a transition is inserted in the main circuit by the opening switch 14 and in regeneration connections until the line switch is opened.

In a similar manner, there is established a "returning" circuit for the cam group #35 in normal position $a'$ of the motor combination drum from the contact segment 182 thereof through control finger 216, conductor 217, actuating coil 218 of the cam group #35 and conductor 196 to the negative conductor B—, as just traced.

To effect the transition of the motors to the intermediate speed combination, the motor combination drum is moved to its position $b'$ and the speed drum is returned to its position $b$, as previously explained, thus establishing a circuit from the contact segment 182 through control finger 185, conductors 186 and 187, contact segment 188 of the cam group #34, in either its normal position S or its transition position $x$, conductor 189, actuating coil 190 of the cam group #34 and conductors 191 and 196 to the negative conductor B—, as previously traced.

The cam group #34 thereupon begins to move in the direction of the arrow located near the coil 190, or, in other words, toward the position SP. Just before the cam group reaches its position $x$, however, the actuating coil of the switch 31 becomes de-energized by reason of the removal of the contact segment 159 of the cam group #34 from the energizing circuit of that coil. In order to ensure that the transition will not be effected until the switch 31 has actually opened, thus avoiding undesirable short-circuit currents, the movement of the cam group #34 beyond position $y$ is prevented by reason of the de-energization of the actuating coil 190 in that position unless the switch 31 has opened to cause the interlock or auxiliary contact segment 31—out (of the familiar type shown in Fig. 1 in connection with switch 14) to bridge the gap between conductors 187 and 189, or, in other words, to parallel the contact segment 188.

To prevent the cam group #34 from stalling in an intermediate position if the resistor switch 14 closes after the initial movement of the group to thus remove the interlock 14—out from the circuit of the coil 190, a contact segment 199 is provided on the group drum to bridge the interlock 14—out by connecting conductors 196 and 197 in intermediate drum positions to ensure that the coil 190 will be energized to carry the drum to position SP. A corresponding contact segment 199a is provided on the cam group #35, as will be understood.

In the final position SP of the cam group #34, the actuating coil of the motor switch 33 is again energized but the actuating coil of the switch 31 remains de-energized, as is indicated in the corresponding line of the sequence chart, Fig. 2.

The function of the push-button or auxiliary device 109 and its attendant circuits may be set forth as follows. Contact segments 169 and 195 on #34 interlock drum are used to prevent the closure of the line switch LS until the #34 group has been thrown fully to one of its operating positions S or SP.

In order to insure a closed-circuit transition, the contact LS—in is provided to hold the line switch closed during a movement of #34 group when the circuit of the coil of the line switch would otherwise be broken.

To prevent the operator from unknowingly attempting to accelerate the locomotive from rest in the second or third motor combination, the "operating" circuit to the line switch coil is interrupted in the second and third combinations by opening the circuit of conductor 170 in the SP position of #34 group. The operating circuit is carried through a push-button 109 and includes conductors 192 and 194. This push-button is provided to enable the operator to close the line switch in the second or third motor combination when it is desired to start "motoring" from a coasting speed sufficient to eliminate the necessity for notching through the lower speed combination.

After movement of the cam group #34, the speed drum may be actuated through its successive resistor-short-circuiting positions and also through its field shunting positions $p$ and $q$, as already described.

To effect the final transition of the motors to the highest speed combination, the motor combination drum is actuated to its position $c'$ and the speed drum is then returned to a certain intermediate position, as indicated in the sequence chart, Fig. 2, to ensure the inclusion of a certain amount of resistance in the motor circuit during the transitional period.

In position $c'$ of the motor combination drum, a new circuit is established from the contact segment 182 through the control finger 200, conductor 201, control fingers 202 and 203, which are bridged by contact segment 204 in position SP of the cam group #34, whence circuit is continued through conductors 205 and 206, contact segment 207 of the cam group #35 in its positions SP and $x'$, conductor 208, actuating coil 209 and conductor 210 to the negative conductor B—, as previously traced.

As soon as transition position $x'$ is reached, motor switches 29, 30 and 32 are de-energized by reason of the removal of contact segment 156 from the circuits of their actuating coils and the actuating coil of the switch 29 is not again energized in position P, as will be evident from the contour of the corresponding contact segments.

In order to ensure that the switches 29 and 32 have actually opened before the cam group #35 reaches its position P, thereby avoiding short-circuit conditions, the previously-traced circuit of the actuating coil 209 for the cam group is de-energized as soon as position $y'$ is reached, unless the switches 29 and 32 have opened to cause the bridging of interlocks or auxiliary contact segments 29—out and 32—out between conductors 206 and 208, or, in other words, in parallel relation to the contact segment 207 of the cam group #35.

The speed drum may then be actuated through its successive positions in the manner previously described to increase the speed of the motors to the maximum value.

When it is desired to effect regenerative operation of the main motors, the regeneration drum is thrown to its position "Reg.," whereupon a circuit is established from the positive conductor B+ through contact segment 214 of the regeneration drum, conductor 215, middle blade 93 of the interlocking switch device 107, conductor 221, actuating coil "Reg." of the main-circuit changeover drum #41 and thence to the negative conductor B—. The changeover drum is thus thrown to its regenerative position.

By reason of the provision of the interlocking switching device 107, it will be noted that regeneration of the main machines cannot be effected when the axle-driven generator 70 is de-energized for any reason. This follows from the fact that the opening of the switch blades 90 and 91, which respectively control the field circuit of the axle-generator and the actuating coil 142 of the auxiliary changeover drum #42, also opens the middle switch blade 93, thereby preventing the energization of the actuating coil Reg. of the main changeover drum #41. In this way, it is impossible to arrange the main motor circuits for regenerative operation. On the other hand, it is possible to prevent regenerative operation alone by opening the switch blade 93 and still allow energization of the axle-generator 70 for other purposes.

During motoring operation, the positions $p$ and $q$ of the speed drum were employed for field control, as already described, whereas, during regeneration, the positions $o$ and $q$ and the same contact segment 151 are employed for manually effecting a strengthening or weakening action upon the field winding 132 of the axle-generator 70, thus correspondingly varying the excitation of the main motor field windings.

Under these conditions, a new circuit is established as soon as the speed drum reaches its position $o$ from the contact segment 151 thereof, through control finger 222, conductor 223, contact disk 224 of the relay device 43S, conductor 225, contact segment 226 of the main changeover drum in its position "Reg.," conductor 227, field coil S and armature 115 of the pilot motor 104.

In this way, the face-plate rheostat 105 is actuated to reduce the active value of the resistor 130 and thus directly increase the excitation of the axle-generator 70 and, therefore, indirectly the excitation of the main machine field windings.

On the other hand, by actuating the speed drum to its position $q$, a new circuit is established from the control finger 176 through conductor 228, contact disk 229 of the relay 43W, conductor 230, contact segment 231 of the main changeover drum #41 in its position "Reg.," conductor 232, field winding W and armature 115 of the pilot motor to negative conductor B—. Consequently, the face-plate rheostat 105 is operated in the reverse direction to cause a weakening of the axle-generator excitation and, therefore, of the excitation furnished by the main machine field windings.

The function of the notching relays 43S and 43W is to ensure a positive notching or step-by-step action of the face-plate rheostat 105 when the speed drum is manually oscillated to and from its positions $p$ and $q$, respectively. This action is automatically accomplished by the provision of dash-pots 233 and 234 on the notching relays 43S and 43W, respectively. In this way, the relay coils are energized from the control fingers 222 and 176, respectively. However, the previously-traced circuits through the field windings S and W of the pilot motor 104 are not interrupted by the corresponding notching relays until a definite interval or time element has elapsed, in accordance with the adjustment of the respective dash-pots.

Consequently, between the time of actuating the speed drum to either of its positions $p$ and $q$ and the instant that the corresponding notching relay is lifted to interrupt its controlled circuit, the pilot motor 104 and, therefore, the face-plate rheostat 105 travels over a predetermined distance, or, in other words, a definite resistance step is inserted in, or is excluded from, the circuit of the axle-generator field winding 132.

In other words, the rheostat 105 is prevented from moving above a certain amount at one time, irrespective of the irregularity of manipulation of the speed drum.

Another relay device 240 is associated with the pilot motor 104 and the relay device #75 for the purpose of governing the voltage of the axle-driven generator 70 in a manner to be set forth.

The relay device 240 comprises an actuating coil 241, which is connected across the terminals of the axle-driven generator 70 by means of conductors 242 and 243. The core or plunger 244 for the actuating coil 241 is biased to the illustrated position, corresponding to weak energization of the coil, by means of a suitable spring 245. An oscillatable switch arm or lever 246 is thus biased to the illustrated position of contact with a stationary terminal 247 which is included in the conductor 227, corresponding to the "strengthening" field winding S of the pilot motor 104. The corresponding contact terminal 248 is located opposite the terminal 247 in the conductor 232, which corresponds to the "weakening" field winding W of the pilot motor.

When the speed of the axle-driven generator 70 reaches a certain value, corresponding to a given delivered voltage, the relay device #75 is actuated to its upper position, as previously set forth, to energize the actuating coil 142 and throw the auxiliary changeover switch #42 to its position "Axle Gen."

Another circuit is established by this action of the relay device #75 through upper contact disk 249 of the relay device, conductor 250, oscillatable switch arm 246 of the relay device 240, and thence to the "strengthening" field winding S of the pilot motor 104.

The motor-driven rheostat 105 is thus actuated towards its limiting "strong" position, to increase the excitation of the field winding 132 for the axle-driven generator 70. When the voltage for the generator has built up to a certain point, the energization of the actuating coil 241 of the relay device 240 becomes sufficiently great to cause the switch arm 246 to be moved into contact with the terminal 248, whereby the "weakening" field winding W of the pilot motor 104 is energized.

In this way, the voltage of the axle-driven generator is automatically maintained or adjusted, once the relay device #75 has been actuated to its upper position, irrespective of other control operations. This voltage is thus maintained and regulated during coasting operations as well as under motoring conditions.

A further use of the relay device 240 occurs as follows. Upon the closure of the last-operated resistor-short-circuiting switch 25, during acceleration of the motors in each combination, an interlock 251—25—incloses an auxiliary circuit from the positive terminal B+ of the battery B through the interlock just mentioned, conductors 252 and 250 to the oscillating switch arm 246. Consequently, upon the reduction of the main-machine-circuit-resistance to a given value, in this case the entire elimination of the accelerating resistor 50, the relay device 240 is rendered operative to effect actuation of the pilot motor 104 and, therefore, regulation of the excitation for the axle-driven generator 70.

We do not wish to be restricted to the specific circuit connections or arrangement of parts herein set forth, as various modifications thereof may be effected within the spirit and scope of our invention. We desire, therefore, that only such limitations shall be imposed thereon as are indicated in the appended claims.

We claim as our invention:

1. The combination with a movable member and electrical means for actuating it in a certain direction, of a switching device, means associated with said member for permitting movement thereof for a predetermined distance and means associated with said switching device and independent of said member for permitting continuance of said movement when said device occupies a certain position.

2. The combination with a movable member and electrical means for actuating it in a certain direction, of a switching device, a contact member on said movable member for permitting energization of said means during a portion of the travel of the movable member, and a contact member actuated by said switching device and independent of said member for permitting completion of said travel when said device occupies a certain position.

3. The combination with a movable member and a coil for actuating it in a certain direction, of a switch, a contact segment carried by said member for permitting energization of said coil during the initial travel of said member, and an interlock carried by said switch for permitting bridging of said segment to effect completion of said travel when said switch occupies an open position.

4. In a system of control, the combination with a plurality of dynamo-electric machines, of a movable device having an actuating means and contact members for effecting a transitional operation of said machines, and a switch adapted to act during such operation, one of said contact members being adapted to govern said actuating means for a predetermined degree of movement of said movable device and said switch being adapted independently of said member to effect continuance of said movement after it has acted.

5. In a system of control, the combination with a plurality of dynamo-electric machines, of a movable device having an actuating coil and contact members for effecting a transitional operation of said machines, and a switch adapted to open during such operation, one of said contact members being adapted to permit energization of said coil for a predetermined degree of movement of said device, and said switch being adapted independently of said member to effect completion of said movement after it has closed.

6. In a system of control, the combination with a plurality of dynamo-electric machines, of a movable device having an actuating coil and main and auxiliary contact members for effecting a transitional operation of said machines, and an electrically-controlled switch adapted to be opened by said device during such operation, one of said auxiliary contact members being connected in circuit to energize said coil for the initial portion of the travel of said device, and said switch having an interlock connected to permit the energization of said coil and the completion of said travel after the switch has opened.

7. In a system of control, the combination with a plurality of dynamo-electric machines, of another machine for exciting the field windings of the first-named machines and itself having an exciting field winding, means for changing the grouping of the first-named machines, and means for concurrently varying the energization of said exciting field winding.

8. In a system of control, the combination with a plurality of dynamo-electric machines, of an exciter machine for the field windings of the first-named machines, means for changing the grouping of the first-named machines, and means responsive to such change for varying the voltage of said exciter machine.

9. In a system of control, the combination with a plurality of main dynamo-electric machines, of an auxiliary machine for exciting the field windings of said main machines, means for changing the grouping of the main machines, and switching means dependent upon such change for varying the field strength of said auxiliary machine.

10. In a system of control, the combination with a plurality of main dynamo-electric machines, of an auxiliary machine for exciting the field windings of said main machines, means for re-grouping the machines for a lower speed, and means responsive to such re-grouping for increasing the resistance of the field circuit of said auxiliary machine.

11. In a system of control, the combination with a plurality of main dynamo-electric machines, of an auxiliary machine driven in accordance with the main-machine speed, means for changing the grouping of the main machines, and switching means dependent upon such change for varying the voltage of said auxiliary machine.

12. In a system of vehicle control, the combination with a plurality of vehicle-propelling motors that are also adapted for regeneration, of an axle-driven generator for exciting the motor field windings during the regenerative period, means for re-grouping the motors for a lower speed, and switching means responsive to such re-grouping for increasing the resistance of the field-winding circuit of said axle-driven generator.

13. The combination with a plurality of sources of energy, of a switching device having a plurality of positions respectively corresponding to said sources and biased to one of said positions, and means responsive to certain electrical conditions of one of said sources for actuating said device to another position.

14. The combination with a generator and another source of energy, of a switching device having a plurality of positions respectively corresponding to the use of said generator and said source and biased to the source position, and means responsive to the speed of said generator for actuating said device to the corresponding position.

15. The combination with an axle-driven generator and a storage battery, of a switching device having positions respectively corresponding to the use of said battery and said generator and biased to the battery position, and a relay device responsive to the voltage of said generator for effecting actuation of said device to the generator position.

16. A control system comprising a rheostat, a generator for supplying direct current to said rheostat, and switching means traversed by alternating current from said generator for producing a signal when the movable member of the rheostat reaches one extreme position.

17. In a railway vehicle, the combination with an axle-driven generator, of a rheostat for regulating the excitation thereof, an indicating means, and means dependent upon the arrival of the rheostat arm in its "weakest-field" position for energizing said indicating means, provided the generator is running.

18. The combination with a rheostat, of manual means oscillatable between two positions for effecting movement of one member of said rheostat, and means for ensuring substantially equal increments of movement irrespective of irregularity of such oscillation.

19. The combination with a rheostat, of a manual switching device oscillatable between two positions for effecting movement of one member of said rheostat, and means operative in one of such positions for automatically stopping such movement after a definite interval.

20. The combination with a rheostat, of a manual switching device oscillatable between two positions for effecting movement of one member of said rheostat, and relay means energized in one of such positions for arresting such movement after a definite interval.

21. The combination with a rheostat, of electrical means for actuating one member of said rheostat, manual means oscillatable between two positions for energizing said means, and automatic means for de-energizing said electrical means after a certain time interval.

22. The combination with a rheostat, of a motor for actuating one member of said rheostat, a controller oscillatable between two positions for energizing said motor, and a relay energized in one position of said controller for interrupting the circuit to said motor aft r a definite time interval.

23. The combination with a main dynamo-electric machine, of a switching device for arranging certain circuits to adapt said machine for regeneration, an auxiliary machine for exciting said main machine, and means for rendering inactive either said device or both said device and said auxiliary machine.

24. The combination with a main dynamo-electric machine, of a plural-position switching device having one position corresponding to regenerative operation of said machine, an exciter for said main machine, and means for ensuring that said device cannot be moved to said position whenever said exciter is inoperative.

25. The combination with a main dynamo-electric machine, of a plural-position switching device having one position corresponding to regenerative operation of said machine, an exciter for said main machine, and a two-handle switching device for preventing said device from assuming said position or for effecting such prevention and also for interrupting the field-winding circuit of said exciter.

26. The combination with a main dynamo-electric machine, of a plural-position switching device having an actuating coil and having one position corresponding to regenerative operation of said machine, an exciter for said main machine, and a plural-blade switch having one handle for opening the circuit of said coil and another handle for effecting said opening and for also interrupting the field-winding circuit of said exciter.

27. The combination with a main dynamo-electric machine, of a plural-position switching device having an actuating coil and having one position corresponding to regenerative operation of said machine, an exciter for said main machine, a control device operated from said exciter under predetermined operating conditions thereof, and a plural-blade switch having one handle for opening the circuit of said coil and another handle for effecting said opening and for also rendering said control device inoperative and interrupting the field-winding circuit of said exciter.

28. In a system of vehicle control, the combination with a main dynamo-electric machine, of a plural-position switching device having an actuating coil and having one position corresponding to regenerative operation of said machine, an axle-driven exciter for said main machine, a control device having an actuating coil energized through the agency of said exciter under certain speed conditions thereof, and a plural-blade switch having one separately movable blade for opening the circuit of the coil of said switching device and having a handle for opening all blades to effect said opening and also to prevent the energization of the actuating coil of said control device and the energization of the field-winding circuit of said exciter.

29. In a system of control, the combination with a dynamo-electric machine adapted for both motoring and regeneration, of means for exciting the machine field winding during regeneration, means for varying the field-winding strength in a plurality of steps at times during motoring, and a switching device having a plurality of positions for controlling said exciting means, certain of said positions being also employed for effecting the successive variations of field-winding strength.

30. In a system of control, the combination with a dynamo-electric machine adapted for both motoring and regeneration, of m ans for separately exciting the machine field winding during one type of operation, means for varying the field-winding strength in a plurality of steps at times during the other type of operation, and a switching device having a plurality of positions for controlling said exciting means, all but one of said positions being also employed for effecting the step-by-step variation of the field-winding strength.

31. In a system of control, the combination with a dynamo-electric machine adapted for both motoring and regeneration, of means for separately exciting the machine field winding during regeneration, means for variably shunting the field winding in a plurality of steps at times during motoring, and a controller having a three-position contact segment for effecting strengthening, maintenance and weakening of such excitation and also adapted to eff ct said variable shunting.

32. In a system of control, the combination with a dynamo-electric machine adapted for both motoring and regeneration, of an axle-driven generator for separately exciting the machine field winding during regeneration, means for variably shunting the field winding in a plurality of steps at times during motoring, and a controller having a single contact segment for controlling the excitation of said generator and for effecting said variable shunting.

33. The combination with a plurality of dynamo-electric machines, of a plural-position switching device for changing the grouping of said machines, a switch for governing a common machine circuit and adapted to be opened upon movement of said device, and means for maintaining said switch closed during such movement.

34. The combination with a plurality of dynamo-electric machines, of a plural-position switching device for changing the grouping of said machines, a switch for governing a common machine circuit and itself normally governed by said switching device, an auxiliary device, and means dependent upon the actuation of said auxiliary device for permitting the closure of said switch during coasting periods to start operation with a machine grouping other than the normal initial grouping.

35. The combination with a plurality of dynamo-electric machines, of a plural-position switching device for changing the grouping of said machines, a switch for governing a common machine circuit and having an actuating coil directly energized in one position of said switching device and a push-button device for permitting the energization of said coil during coasting periods at speeds corresponding to another position of said switching device.

36. The combination with a plurality of dynamo-electric machines, of a plural-position switching device for changing the normal initial grouping of said machines in series relation, a line switch for said machines having an actuating coil directly energized in the initial position of said switching device, and a push-button device for permitting the energization of said coil during coasting periods at speeds corresponding to operation of said machines in other than said initial grouping.

37. The combination with a main dynamo-electric machine and an axle-driven exciter therefor, of a rheostat for strengthening and weakening the excitation of said exciter, a plurality of switches for reducing the active resistance value of the main-machine circuit, a relay biased to actuate the rheostat to the limiting "strong" position and having an actuating coil energized by said generator to oppose the biasing effect, and interlocking means responsive to the closure of the last-operated resistance-reducing switch for increasing the energization of said coil.

38. The combination with a plurality of sources of energy, of a switching device having a plurality of positions respectively corresponding to said sources and biased to one of said positions, means adapted to vary the voltage of one of said sources, means responsive to certain electrical conditions of said sources for actuating said device to another position, and means for thereupon rendering said varying means active.

39. The combination with a generator and another source of energy, of a switching device having a plurality of positions respectively corresponding to the use of said generator and said source and biased to the source position, means adapted to automatically adjust the generator voltage, means responsive to the speed of said generator for actuating said device to the corresponding position, and means for thereupon rendering the automatic means operative.

40. The combination with an axle-driven generator and a storage battery, of a switching device having positions respectively corresponding to the use of said battery and said generator and biased to the battery position, a relay energized from said generator and adapted to adjust the voltage thereof, a second relay responsive to the generator voltage for effecting actuation of the switching device to the generator position, and contact means governed by said second relay for thereupon effecting movements of said first relay by or opposing said coil active for the adjusting purpose desired.

41. The combination with a plurality of sources of energy, of a switching device having a plurality of positions respectively corresponding to said sources and biased to one of said positions, a rheostat for governing the voltage of one of said sources, a relay having an actuating coil and an opposing spring for effecting actuation of said rheostat in the one or the other direction, means responsive to certain electrical conditions of one of said sources for actuating said device to another position, and means for thereupon rendering the rheostat operation by said relay effective.

42. The combination with a generator and another source of energy, of a switching device having a plurality of positions respectively corresponding to the use of said generator and said source and biased to the source position, a rheostat for strengthening and weakening the excitation of said generator, a relay biased to actuate the rheostat to the limiting "strong" position and having an actuating coil energized by said generator, a second relay responsive to the generator voltage for effecting actuation of the switching device to the generator position, and contact means governed by said second relay for thereupon effecting movements of said first relay by or opposing said coil active for the adjusting purpose desired.

43. The combination with a movable member and means for actuating said member, of a switch, contact means controlled by said member for rendering said actuating means operative during a portion of the travel of said member, and means governed by said switch for bridging said contact means to effect further travel of said member.

44. The combination with a movable member and means for actuating said member, of a movable device, means controlled by said member for rendering said actuating means operative during a portion of the travel of said member, and means governed by said device and independent of said member for replacing said controlled means to effect further travel of said member.

45. The combination with a plurality of sources of energy, of a switching device having a plurality of positions respectively corresponding to said sources, and means responsive to certain electrical conditions of one of said sources for actuating said device to a predetermined position.

46. The combination with a dynamo-electric machine and means for exciting said machine, of means for adapting the machine circuits for regenerative operation and means for rendering inactive either said adapting means or both said adapting and said exciting means.

In testimony whereof, I, ARTHUR J. HALL, have hereunto subscribed my name this 9 day of July, 1920.

ARTHUR J. HALL.

In testimony whereof, we, PAUL L. MARDIS and ALEXANDER MCIVER, have hereunto subscribed our names this 15th day of June, 1920.

PAUL L. MARDIS.
ALEXANDER McIVER.